(12) United States Patent
Tanaka et al.

(10) Patent No.: US 8,032,490 B2
(45) Date of Patent: Oct. 4, 2011

(54) STORAGE SYSTEM OPERABLE TO PERFORM LU AUDITING

(75) Inventors: Toru Tanaka, Kawasaki (JP); Yuichi Taguchi, Sagamihara (JP); Hiroshi Nasu, Yokohama (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 355 days.

(21) Appl. No.: 12/078,615

(22) Filed: Apr. 2, 2008

(65) Prior Publication Data
US 2009/0204618 A1 Aug. 13, 2009

(30) Foreign Application Priority Data
Feb. 13, 2008 (JP) .................................. 2008-032427

(51) Int. Cl.
*G06F 7/00* (2006.01)
*G06F 17/30* (2006.01)
(52) U.S. Cl. ........................................................ 707/648
(58) Field of Classification Search .................. None
See application file for complete search history.

(56) References Cited

U.S. PATENT DOCUMENTS
| | | | |
|---|---|---|---|
| 5,625,815 A * | 4/1997 | Maier et al. .......................... 1/1 |
| 2007/0017472 A1 | 1/2007 | Letourneau et al. |
| 2007/0088737 A1 | 4/2007 | Kawakami et al. |

FOREIGN PATENT DOCUMENTS
| | | |
|---|---|---|
| JP | 2007-114834 | 10/2005 |
| JP | 2007-172003 | 12/2005 |

OTHER PUBLICATIONS

Baird, "Virtual Storage Architecture Guide (VSAG)", Mass Storage Systems 'Storage—At the Forefront of Information Infrastructures', pp. 312-326, Hewlett Packard, 1995.*

* cited by examiner

*Primary Examiner* — Michael Hicks
(74) *Attorney, Agent, or Firm* — Volpe and Koenig, P.C.

(57) ABSTRACT

A storage system capable of identifying all volumes to be audited is provided.
Operation logs 3005 concerning the operations of volumes are associated with a time and stored in storage apparatuses 1400 and 1500, and a management computer 1100 collects information about these operation logs 3005, restores the status history of the operation logs 3005, sets, as an audit range, the operation logs 3005 including volumes with an audit period and audit target data stored therein, extracts the operation logs 3005 belonging to the audit range from the restored status history of the operation logs 3005, and transmits the extracted operation logs 3005 to a computer (requesting computer) 1000. As a result, all the audit target volumes can be identified.

12 Claims, 13 Drawing Sheets

FIG.6

| HOST NAME (6001) | LU (6002) | CONNECTION DESTINATION IF (6003) |
|---|---|---|
| 1000 | 1411 | 1407 |
| 1000 | 1511 | 1507 |

FIG.7

| STORAGE NAME (7001) | LU (7002) | EXTERNAL LU (7003) | EXTERNAL CONNECTION DESTINATION IF (7004) |
|---|---|---|---|
| 1400 | 1411 | 1511 | 1507 |
| 1400 | 1412 | | |
| 1400 | 1413 | | |
| 1400 | 1414 | | |
| 1500 | 1511 | | |
| 1500 | 1512 | | |
| 1500 | 1513 | | |
| 1500 | 1514 | | |

FIG.8

| DATE AND TIME | STORAGE | OPERATION CONTENT | LU1 | LU2 |
|---|---|---|---|---|
| 2005/04/01-10:00 | 1400 | LU CREATION (LU 1) | 1512 | — |
| 2005/10/01-10:00 | 1500 | DATA MIGRATION (SOURCE: LU1; DESTINATION: LU2) | 1512 | 1411 |
| 2005/10/01-12:00 | 1400 | EXTERNAL LU CREATION (VIRTUAL: LU1; EXTERNAL : LU2) | 1411 | 1513 |
| 2006/04/01-10:00 | 1400 | PAIRING (PRIMARY: LU1; SECONDARY: LU2) | 1411 | 1413 |
| 2006/04/01-10:00 | 1400 | PAIRING (PRIMARY: LU1; SECONDARY: LU2) | 1411 | 1514 |
| 2006/04/01-10:00 | 1400 | PAIR DELETION (PRIMARY: LU1; SECONDARY: LU2) | 1411 | 1413 |
| 2006/04/01-10:00 | 1400 | EXTERNAL LU DELETION (VIRTUAL: LU1; EXTERNAL : LU2) | 1411 | 1513 |
| 2006/04/01-10:00 | 1400 | EXTERNAL LU DELETION (VIRTUAL: LU1; EXTERNAL : LU2) | 1411 | 1511 |
| 2007/04/01-10:00 | 1400 | SHREDDING (LU1) | 1413 | — |
| 2007/04/01-10:00 | 1500 | SHREDDING (LU1) | 1513 | — |
| 2007/10/01-10:00 | 1500 | SHREDDING (LU1) | 1514 | — |

FIG.9

| STORAGE 9001 | LU 9002 | START DATE AND TIME 9003 | END DATE AND TIME 9004 | STATUS 9005 |
|---|---|---|---|---|
| 1400 | 1411 | 2005/04/01-10:00 | 2005/10/01-10:00 | VIRTUAL LU |
| 1400 | 1411 | 2005/10/01-10:00 | — | VIRTUAL LU |
| 1400 | 1413 | 2006/04/01-10:00 | 2006/10/01-10:00 | SECONDARY LU |
| 1400 | 1413 | 2006/10/01-10:00 | 2007/04/01-10:00 | LU |
| 1500 | 1511 | 2006/10/01-10:00 | — | EXTERNAL LU |
| 1500 | 1512 | 2005/04/01-10:00 | 2005/10/01-10:00 | LU |
| 1500 | 1513 | 2005/10/01-10:00 | 2006/10/01-10:00 | EXTERNAL LU |
| 1500 | 1513 | 2006/10/01-10:00 | 2007/04/01-10:00 | LU |
| 1500 | 1514 | 2006/04/01-10:00 | 2007/04/01-10:00 | PAIRED |
| 1500 | 1514 | 2007/04/01-10:00 | 2007/10/01-10:00 | LU |

LU STATUS HISTORY SEARCH SCREEN — 17000

SEARCH CONDITIONS
- AUDIT TARGET LU : 1411 — 17001
- AUDIT PERIOD : 2007/04/01 – 2007/12/31 — 17002
- [UPDATE] — 17003

SEARCH RESULTS

AUDIT TARGET LUs — 17004

| LU | TARGET PERIOD | LOG |
|---|---|---|
| 1411 | 2007/04/01 – 2007/12/31 | ACQUIRED |
| 1511 | 2007/04/01 – 2007/12/31 | ACQUIRED |
| 1514 | 2007/04/01 – 2007/10/31 | ACQUIRED |

17005

LU STATUS HISTORY SEARCH — 17006

| LU | 05/04 | 05/10 | 06/04 | 06/10 | 07/04 | 07/10 | 07/12 |
|---|---|---|---|---|---|---|---|
| 1411 | | | | | | | |
| 1412 | | | | | | | |
| 1413 | | | | | | | |
| 1414 | | | | | | | |
| 1511 | | | | | | | |
| 1512 | | | | | | | |
| 1513 | | | | | | | |
| 1514 | | | | | | | |

EXPLANATORY NOTES — 17007
- ○ : LU
- ◌ : VIRTUAL LU
- → : DATA MIGRATED
- △ : SECONDARY LU
- □ : EXTERNAL LU
- ✗ : SHREDDED

STORAGE SYSTEM OPERABLE TO PERFORM LU AUDITING

CROSS-REFERENCES TO RELATED APPLICATIONS

This application relates to and claims priority from Japanese Patent Application No. 2008-032427, filed on Feb. 13, 2008, the entire disclosure of which is incorporated herein by reference.

BACKGROUND

1. Field of the Invention

The present invention relates to a log management technique for a storage system in which storage apparatuses and computers are connected to each other via a network. More particularly, this invention relates to a technique for auditing operation logs concerning operations of storage apparatuses.

2. Description of Related Art

In recent years, the amount of data handled by computers has been increasing because of computer performance upgrades and the advancement of Internet connection speeds. Also, because of statutory regulations and in order to deal with lawsuits, there is a growing need for file auditing using storage operation logs. Therefore, techniques to store the storage volume setting change history as an audit log and transmit the stored audit log to a log management server (see Japanese Patent Application Laid-Open (Kokai) Publication No. 2007-114834), and techniques to generate, based on configuration information, fault logs for connected volumes, gather the generated fault logs and transmit them to a management server (see Japanese Patent Application Laid-Open (Kokai) Publication No. 2007-172003) are suggested.

In conventional techniques, audit logs and/or fault logs are generated. However, these logs are not generated by associating audit target data with events or time and, therefore, it is impossible to know what kind of events took place in which volumes in the past and so find target volumes that require auditing. Furthermore, since logs (volumes and time) requiring auditing cannot be identified, unnecessary logs will be generated and the auditing workload will increase.

SUMMARY

It is an object of the present invention to provide a storage system capable of identifying all volumes to be audited.

In order to achieve the above-described object, according to an aspect of this invention, operation logs concerning the operations for volumes are associated with a time and stored in storage devices, and computer(s) collect the operation logs stored in the storage devices and restore their status history, and extract operation logs belonging to an audit range from the status history of the restored operation logs.

According to an aspect of this invention, all volumes to be audited can be identified.

Other aspects and advantages of the invention will be apparent from the following description and the appended claims.

BRIEF DESCRIPTION OF THE DRAWINGS

FIG. 6 is an explanatory diagram of a computer setting table according to the embodiment of the invention.

FIG. 7 is an explanatory diagram of a storage setting table according to the embodiment of the invention.

FIG. 8 is an explanatory diagram of an operation log according to the embodiment of the invention.

FIG. 9 is an explanatory diagram of an LU status history table according to the embodiment of the invention.

FIG. 17 is an explanatory diagram of an LU status history search screen according to the embodiment of the invention.

DETAILED DESCRIPTION OF PREFERRED EMBODIMENTS

Embodiments of the present invention will be explained below with reference to the attached drawings.

First Embodiment

First the outline of an embodiment for implementing this invention will be explained below. This embodiment describes the case where a computer 1000 as a requesting computer that requests auditing, audits files accumulated in a storage apparatus 1400.

Figure 1:
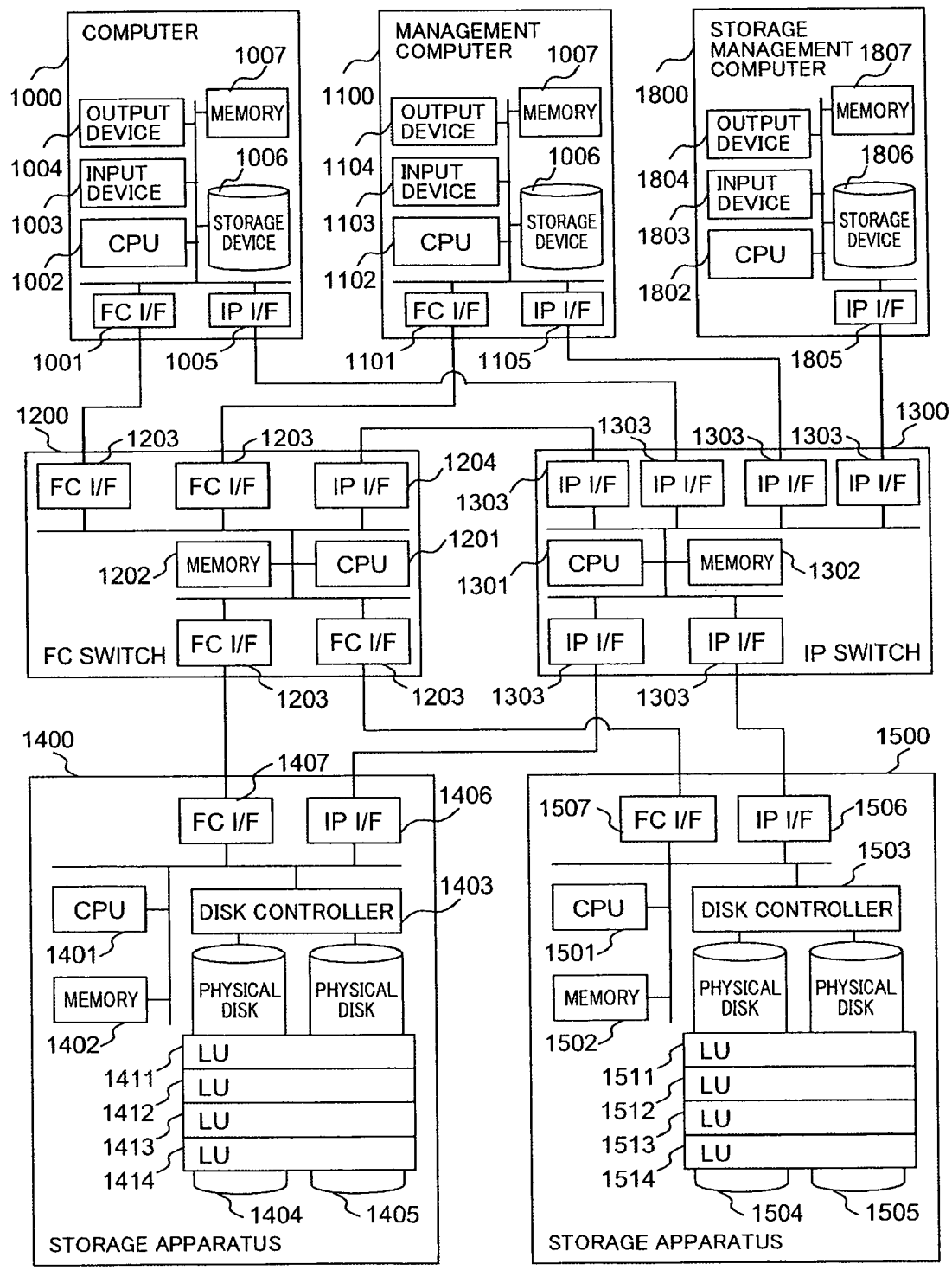
FIG. 1 is an explanatory diagram of the system configuration according to an embodiment of the present invention.

FIG. 1 shows the system configuration of an embodiment for implementing the present invention. Referring to FIG. 1, the computer 1000 is a computer that performs input to and/or output from storage apparatuses 1400 and 1500. The computer 1000 includes: an FC I/F 1001 for sending/receiving input/output data to/from the storage apparatus 1400 and/or the storage apparatus 1500; an IP I/F 1005 for sending/receiving management data to/from the management computer 1100; a CPU 1002 for controlling the entire computer by executing programs; memory 1007 serving as a storage area for the programs; a storage device 1006 for storing, for example, the programs and user data; input devices 1003 such as a keyboard and a mouse for a user to input information; and output devices 1004 such as a display for displaying information for the user.

A management computer 1100 is a computer that manages the computer 1000 and the storage apparatuses 1400 and 1500. The management computer 1100 includes: an FC I/F 1101 for sending/receiving input/output data and control data to/from the storage apparatus 1400; an IP I/F 1105 for sending/receiving management data to/from the computer 1000 and the storage apparatuses 1400 and 1500; a CPU 1102 for controlling the entire computer by executing programs; memory 1107 serving as a storage area for the programs; a storage device 1106 for storing, for example, the programs and user data; input devices 1103 such as a keyboard and a mouse for a user to input information; and output devices 1104 such as a display for displaying information for the user.

An FC switch 1200 is a switch device for transferring input/output data from the management computer 1100 to, for example, the storage apparatus 1400 and/or the storage apparatus 1500. The FC switch 1200 includes: an FC I/F 1203 for sending/receiving input/output data; an IP I/F 1204 for sending/receiving management data; a CPU 1201 for controlling the entire FC switch by executing programs; and memory 1202 serving as a storage area for the programs and data.

An IP switch 1300 is a switch device for transferring management data from the management computer 1100 to, for example, the computer 1000. The FC switch 1300 includes: an IP I/F 1303 for sending/receiving management data; a CPU 1301 for controlling the entire IP switch by executing programs; and memory 1302 serving as a storage area for the programs and data.

The storage apparatus 1400 is a node for processing input/output data from the computer 1000. The storage apparatus 1400 includes: an FC I/F 1407 for receiving input/output data transferred from the FC switch; an IP I/F 1406 for receiving management data from the management computer 1100; a CPU 1401 for controlling the entire storage apparatus by executing programs; memory 1402 serving as a storage area for the programs; a disk controller 1403 for controlling disk devices; disk devices 1404, 1405 storing user data; and LUs 1411, 1412, 1413, and 1414 that are disk devices divided into smaller units numbered and displayed on a screen for the user.

The storage apparatus 1500 is a node for processing input/output data from the computer 1000. The storage apparatus 1500 includes: an FC I/F 1507 for receiving input/output data transferred from the FC switch; an IP I/F 1506 for receiving management data from the management computer 1100; a CPU 1501 for controlling the entire storage apparatus by executing programs; memory 1502 serving as a storage area for the programs; a disk controller 1503 for controlling disk devices; disk devices 1504, 1505 storing user data; and LUs 1511, 1512, 1513, and 1514 that are disk devices divided into smaller units numbered and displayed on a screen for the user.

A storage management computer 1800 is a computer that operates the storage apparatuses 1400, 1500. The storage management computer 1800 includes: an IP I/F 1805 for sending/receiving data to/from the computer 1000, the management computer 1100, and the storage apparatuses 1400, 1500; a CPU 1802 for controlling the entire computer by executing programs; memory 1807 serving as a storage area for the programs; a storage device 1806 for storing the programs and user data; input devices 1803 such as a keyboard and a mouse for a user to input information; and output devices 1804 such as a display for displaying information for the user.

The memory 187 for the storage management computer 1800, as in the case of the management computer 1100, stores information such as a log management program, a setting management program, a management computer setting table, a storage setting table, operation logs, and an LU status history table.

Regarding the management computer 1100 and the storage apparatuses 1400, 1500, the same reference numerals are given to their respective storage apparatus setting tables 3004 and operation logs 3005 to simplify explanation. However, the operation logs 3005 in the storage apparatuses 1400, 1500 may store different information. Furthermore, the content of the operation logs 3005 for the storage apparatuses 1400, 1500 is collected to create the operation log 3005 for the management computer 1100.

Figure 2:
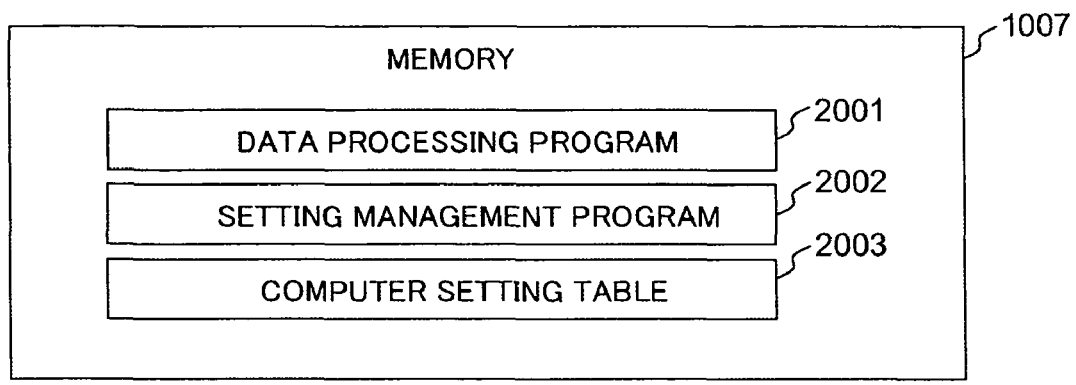
FIG. 2 is an explanatory diagram of the memory configuration of a computer according to the embodiment of the invention.

FIG. 2 shows the memory configuration of the computer 1000. When the computer 1000 is activated, it reads into its memory 1007: a data processing program 2001 for sending/receiving data to/from the storage apparatus 1400; a setting management program 2002 for managing setting information about the computer; and a computer setting table 2003 of the setting information about the computer.

Figure 3:
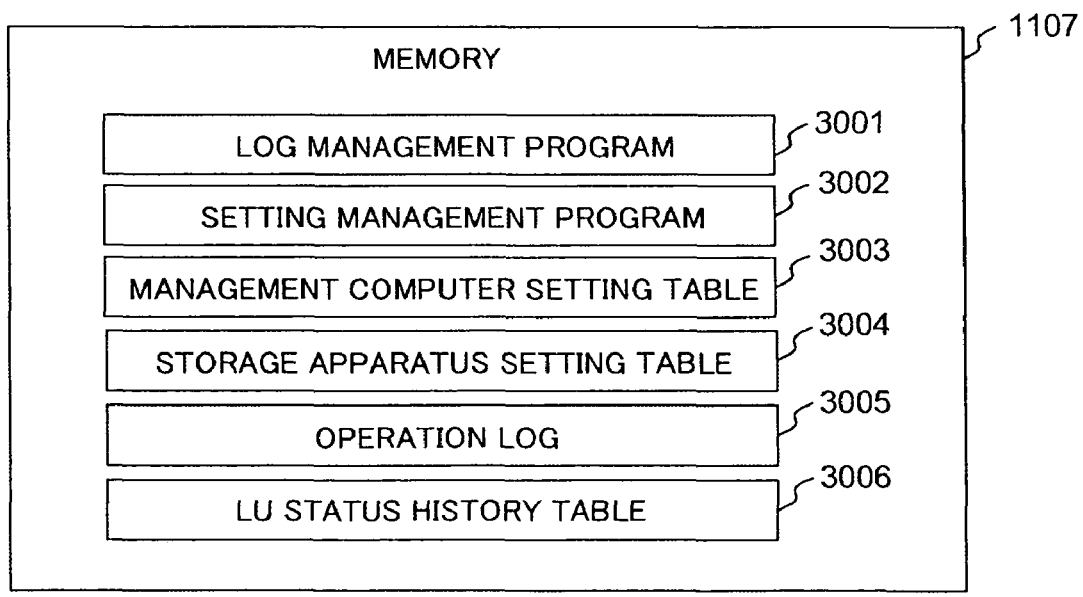
FIG. 3 is an explanatory diagram of the memory configuration of a management computer according to the embodiment of the invention.

FIG. 3 shows the memory configuration of the management computer 1100. When the management computer 1100 is activated, it reads into its memory 1107: a log management program 3001 for restoring LU relation history information and showing an audit target range to the user; a setting management program 3002 for managing setting information about the management computer; a management computer setting table 3003 of the setting information about the management computer; a storage apparatus setting table 3004 of information about the storage apparatuses 1400, 1500; an operation log 3005 for the storage apparatuses 1400, 1500; and an LU status history table 3006 of information about relations between LUs in the past.

Figure 4:
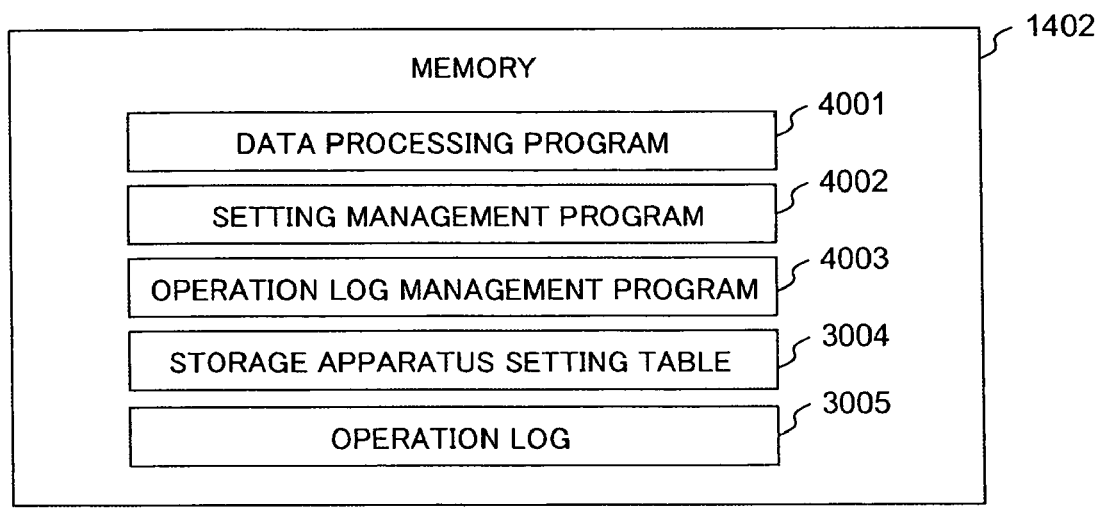
FIG. 4 is an explanatory diagram of the memory configuration of a storage apparatus according to the embodiment of the invention.

FIG. 4 shows the memory configuration of the storage apparatus 1400. When the storage apparatus 1400 is activated, it reads into its memory 1404: a data processing program 4001 for allowing, for example, a search computer 1000 to access the storage apparatus 1400; a setting management program 4002 for managing setting information about the storage apparatus; an operation log management program 4003 for managing an operation log for the storage apparatus; a storage apparatus setting table 3003 of the setting information about the storage apparatus; and an operation log 3005 for the storage apparatus.

Figure 5:
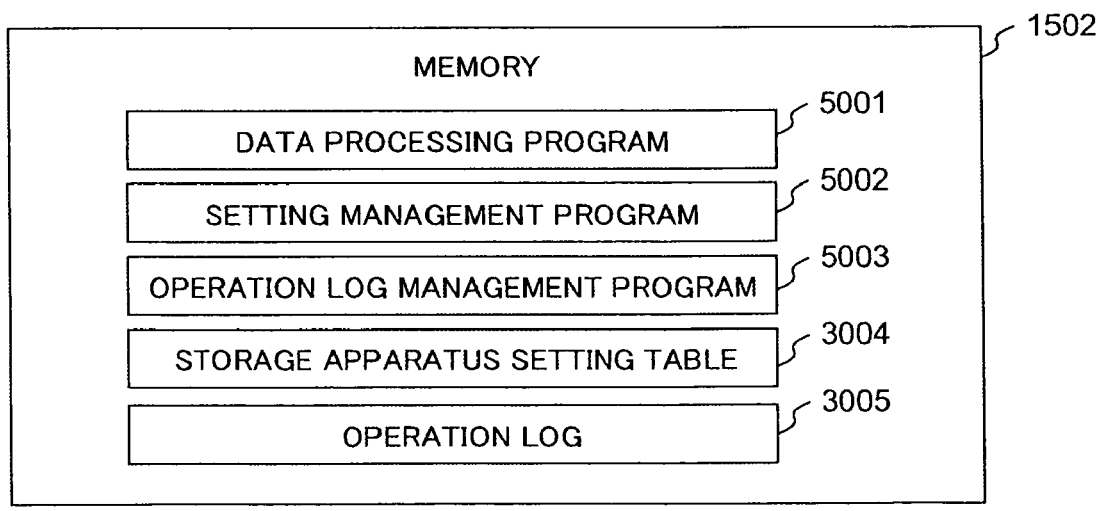
FIG. 5 is an explanatory diagram of the memory configuration of a computer according to the embodiment of the invention.

FIG. 5 shows the memory configuration of the storage apparatus 1500. When the storage apparatus 1500 is activated, it reads into its memory 1504: a data processing program 5001 for allowing, for example, the search computer 1000 to access the storage apparatus 1500; a setting management program 5002 for managing setting information about the storage apparatus; an operation log management program 5003 for managing an operation log for the storage apparatus; a storage apparatus setting table 3003 of the setting information about the storage apparatus; and an operation log 3005 for the storage apparatus.

FIG. 6 shows the configuration of the computer setting table 2003. The computer setting table 2003 includes: a host name 6001 that is an identifier for the computer; an LU 6002 that indicates an identifier for the relevant LU used by the computer; and a connection destination IF 6003 that indicates the destination where the LU used by the computer is connected.

FIG. 7 shows the configuration of the storage apparatus setting table 3003. The storage apparatus setting table 3003 includes: a storage name 7001 that is an identifier for the relevant storage apparatus; an LU 7002 that indicates an identifier for the relevant LU; an external LU 7003 that indicates an identifier for the relevant actual external LU when the external LU is used virtually as an internal LU; and an external connection destination IF 7004 that indicates the destination where the external LU is connected.

FIG. 8 shows the configuration of the operation log 3005. The operation log 3005 includes: a date and time 8001 when the relevant operation is executed; storage 8002 that indicates an identifier for the relevant storage apparatus; the operation content 8004 indicating the details of the relevant operation executed; and LU1 8004 and LU2 8005 that are the target LUs of the relevant operation content. Letter strings "LU1" and "LU2" in the operation content 8004 indicate LU1 8004 and LU2 8005.

If the operation content 8004 is "data migration (source: LU1; and destination: LU2)" and LU1 8004 is "1512" and LU2 8005 is "1411," this means that the migration source LU for the data migration is LU1, i.e., LU 1512, and the migration destination LU for the data migration is LU2, i.e., LU 1411. Also, if the operation content 8004 is "external LU creation (virtual: LU1; and external: LU2)," this means that the virtual LU is LU1 8004 and the external LU is LU2 8005. If the operation content 8004 is "pairing (primary: LU1; and secondary: LU2)," this means that the primary LU is LU1 8004 and the secondary LU is LU2 8005.

FIG. 9 shows the configuration of the LU status history table. The LU status history table 3006 includes: storage 9001 that indicates an identifier for the relevant storage apparatus; an LU 9002 that indicates an audit target LU; a start date and time 9003 indicating the date and time when the relevant operation was started; an end date and time 9004 indicating the date and time when the relevant operation was terminated; and the status 9005 indicating the status of the relevant operation, i.e., the status shown in the status history of the operation log 3005 restored by the management computer 1100.

For example, the restored status history shows that the audit target LU 1411 in the storage apparatus 1400 became a virtual LU at 10:00 on Apr. 1, 2005 and still continues to be in the virtual LU status. The restored status history also shows that the audit target LU 1413 in the storage apparatus 1400 became a secondary LU at 10:00 on Oct. 1, 2006 and was then changed to an LU at 10:00 on Apr. 1, 2007. Furthermore, the restored status history shows that the audit target LU 1511 in the storage apparatus 1500 was generated as an external LU at 10:00 on Oct. 1, 2006 and still continues to be in that external LU status. Similarly, the restored status history shows that the audit target LU 1511 is an external LU, that the audit target LU 1513 was changed from an external LU to an LU, and also shows the period during which the audit target LU 1514 was paired, and the period during which the audit target LU 1514 was an primary LU.

Figure 10:
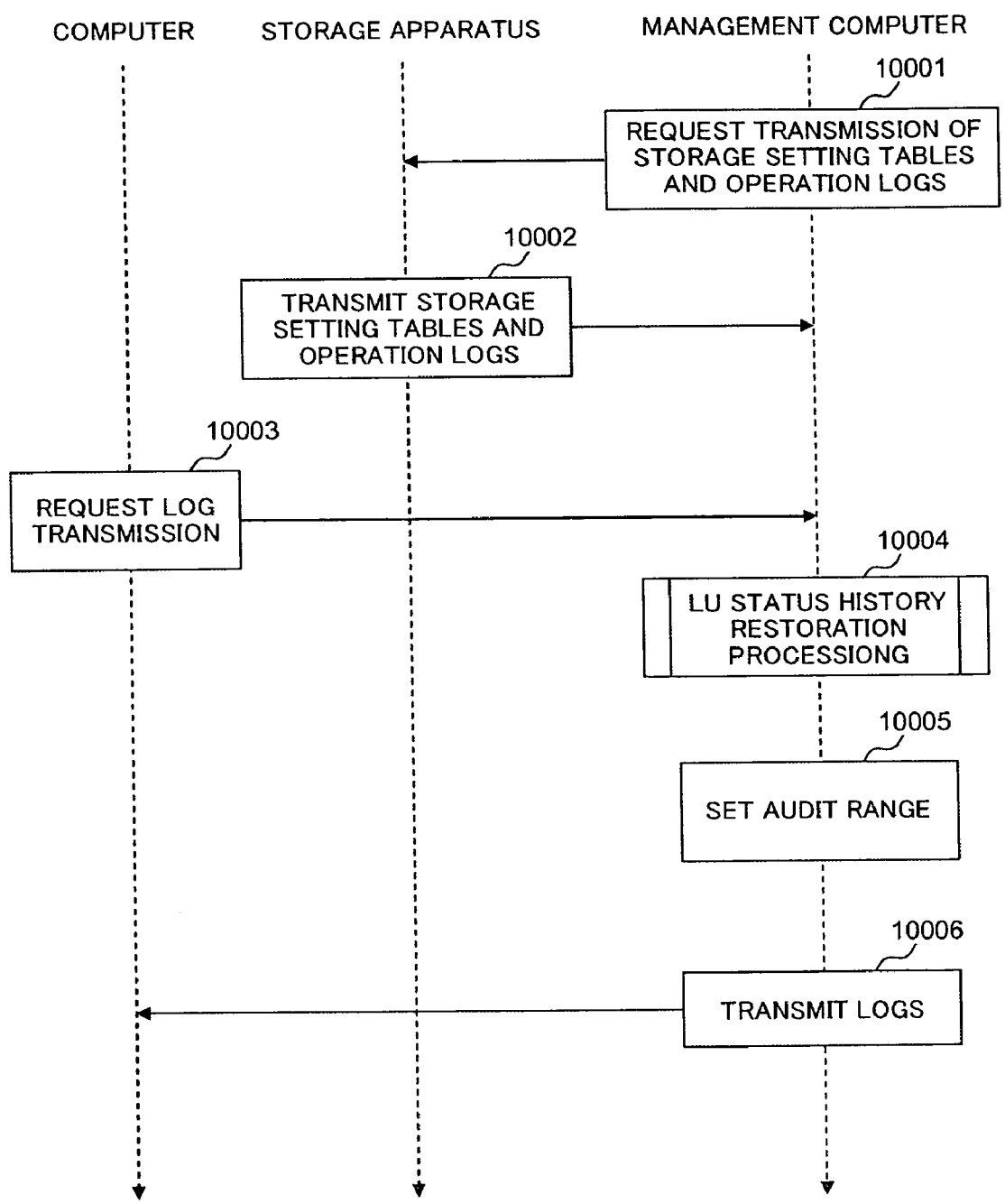
FIG. 10 is an explanatory diagram of operation log transmission processing according to the embodiment of the invention.

FIG. 10 shows the flow of operation log transmission processing. As a result of processing executed by the CPU 1102, the setting management program 3002 of the management computer 1100 sends a request for transmission of the storage setting tables and the operation logs to the storage apparatuses 1400 and 1500 (step 10001). Having received the transmission request, CPUs 1401 and 1501 execute processing to cause the setting management programs 4002, 5002 of the storage apparatuses 1400, 1500 send the storage setting tables 3004 and the operation logs 3005 to the management computer 1100 (step 10002). The storage setting tables 3004 and the operation logs 3005 may be transmitted when the transmission request from the management computer 1100 is received or when any change is made to the relevant tables or logs.

Next, the setting management program 2002 of the computer 1000 sends a request for transmission of the operation logs, including an audit period and LUs with audit target data stored therein, to the management computer 1100 (step 1003). After receiving the transmission request, the log management program 3001 of the management computer 1100 executes LU status history restoration processing (step 10004), sets, as an audit range, the results of searching the LU status history table for the designated audit period and LUs (step 10005), and then transmits logs belonging to the audit range which was set in the previous step (step 10006).

Figure 11:
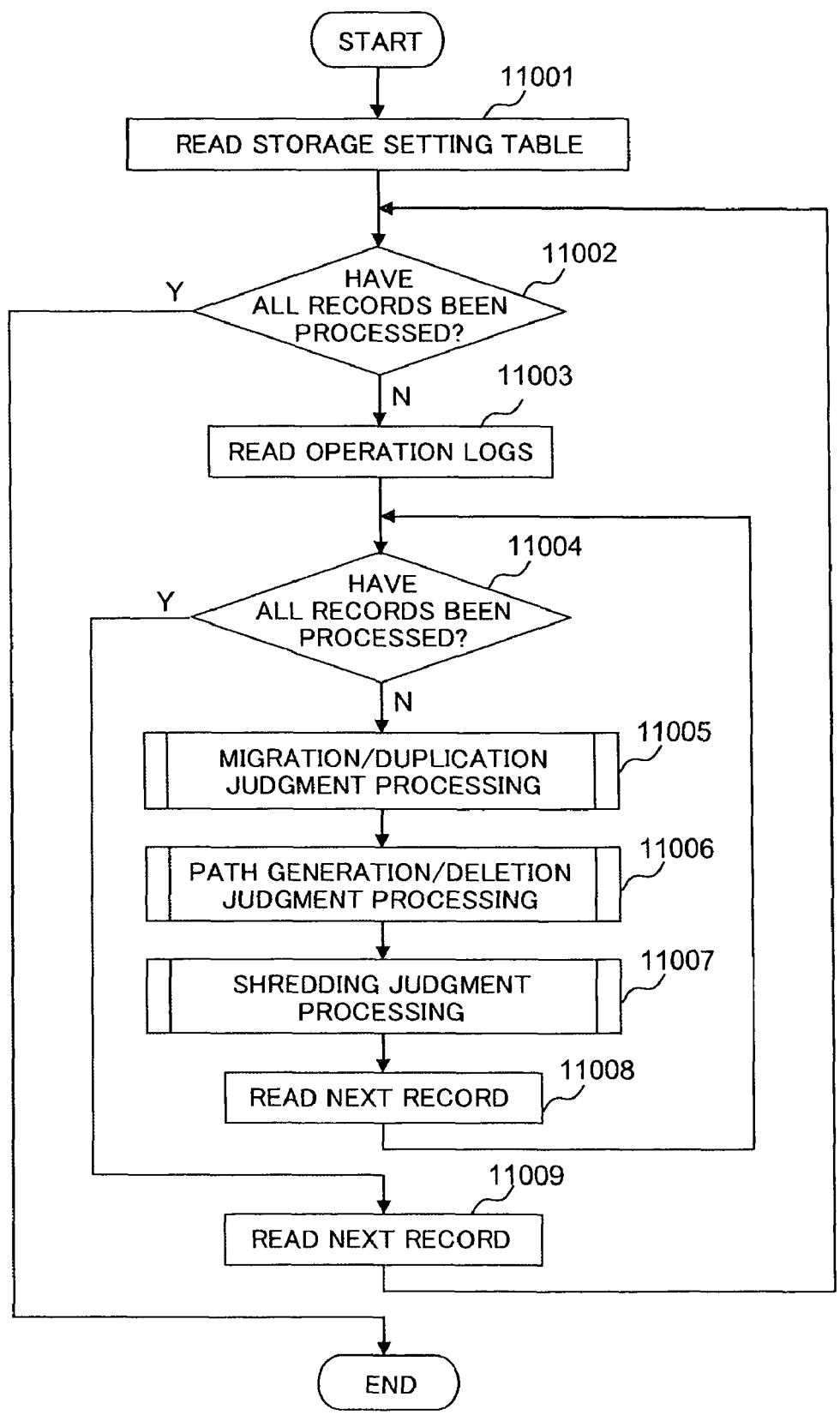
FIG. 11 is an explanatory diagram of LU status history restoration processing according to the embodiment of the invention.

FIG. 11 shows the flow of LU status history restoration processing. As a result of processing executed by the CPU 1102, the log management program 3001 of the management computer 1100 reads records of LUs structurally related (such as by external connection) with the LUs storing the audit target data as designated in the storage setting table, and selects the first record (step 11001). Subsequently, the log management program 3001 judges whether all the records have been processed or not (step 11002). If step 11002 returns an affirmative judgment, the log management program 3001 terminates the processing; and if step 11002 returns a negative judgment, the log management program 3001 reads the operation logs of the selected LUs in descending order and selects the first record (step 11003).

The log management program 3001 judges whether all the records have been processed or not (step 11004). If step 11004 returns an affirmative judgment, the log management program 3001 reads the next record in the storage setting table (step 11009); and if step 11004 returns a negative judgment, the log management program 3001 executes migration/duplication judgment processing (step 11005), path generation/deletion judgment processing (step 11006), and shredding judgment processing (step 11007), and then reads the next record in the operation logs (step 11008).

Figure 12:
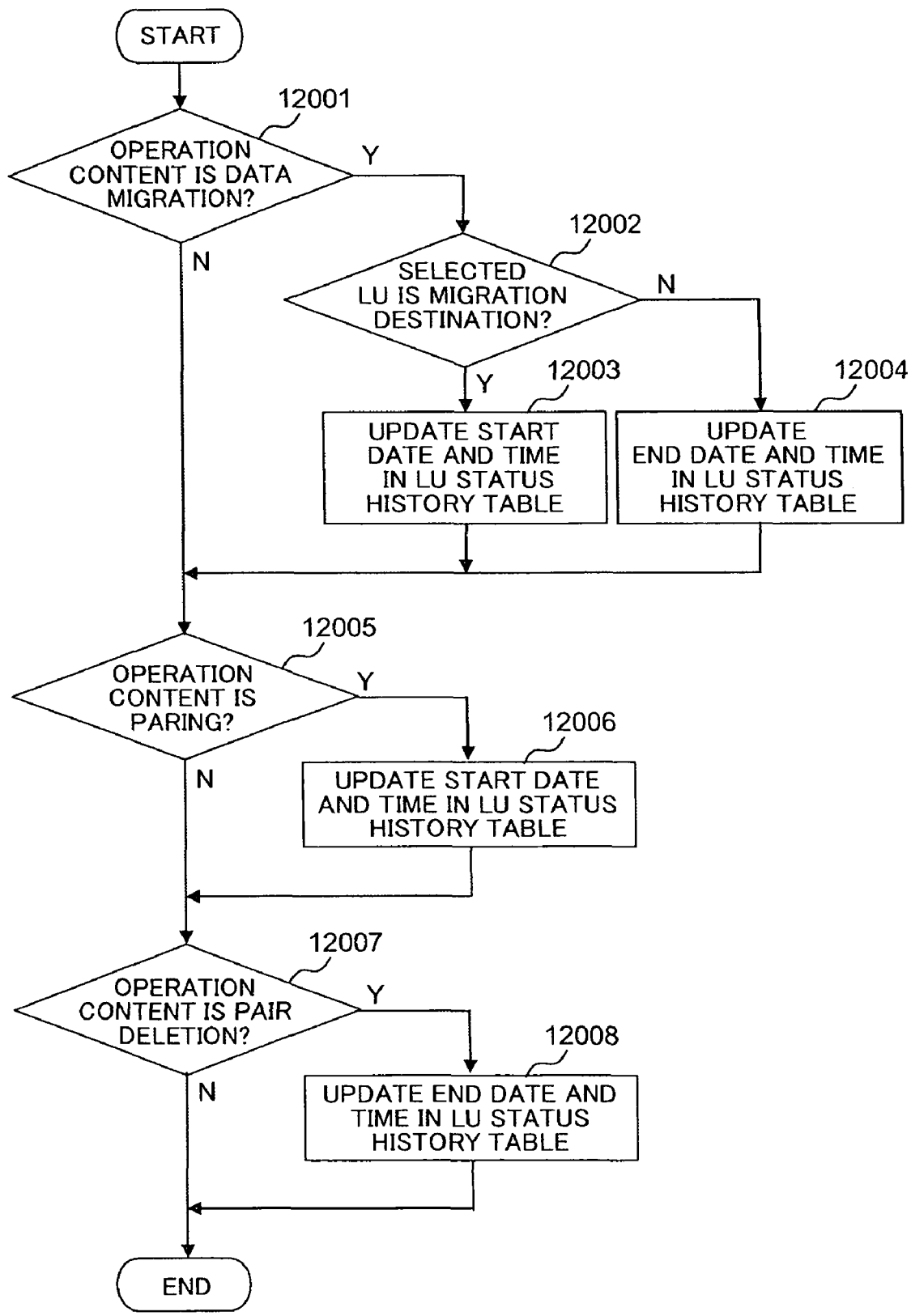
FIG. 12 is an explanatory diagram of migration/duplication judgment processing according to the embodiment of the invention.

FIG. 12 shows the flow of the migration/duplication judgment processing. As a result of processing executed by the CPU 1102, the log management program 3001 of the management computer 1100 judges whether the operation content includes "data migration" or not (step 12001). If step 12001 returns an affirmative judgment, the log management program 3001 judges whether the selected LU is a migration destination or not (step 12002). If step 12002 returns an affirmative judgment, the log management program 3001 generates a record of the selected LU in the LU status history table and writes the date and time of the relevant operation log into the start date and time in the LU status history table (step 12003). If step 12002 returns a negative judgment, the log management program 3001 writes the date and time of the relevant operation log into the end date and time in the LU status history table (step 12004).

As a result of processing executed by CPU 1102, if step 12001 returns a negative judgment, the log management program 3001 of the management computer 1100 judges whether the operation content includes "pairing" or not (step 12005). If step 12005 returns an affirmative judgment, the log management program 3001 generates a record of the selected LU in the LU status history table and writes the date and time of the relevant operation log into the start date and time in the LU status history table (step 12006). If step 12005 returns a negative judgment, the log management program 3001 of the management computer 1100 judges whether the operation content includes "pair deletion" or not (step 12007). If step 12007 returns an affirmative judgment, the log management program 3001 writes the date and time of the relevant operation log into the end date and time in the LU status history table (step 12008), and then terminates the processing.

Figure 13:
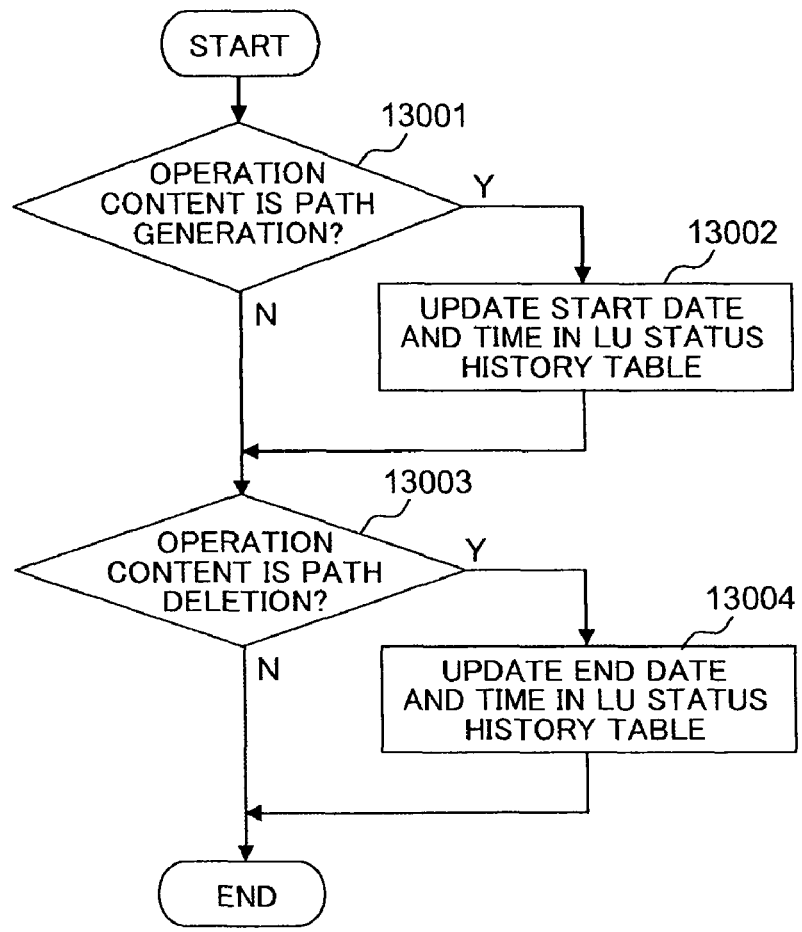
FIG. 13 is an explanatory diagram of path generation/deletion judgment processing according to the embodiment of the invention.

FIG. 13 shows the flow of the path generation/deletion judgment processing. As a result of processing executed by the CPU 1102, the log management program 3001 of the management computer 1100 judges whether the operation content includes "path generation" or not (step 13001). If step 13001 returns an affirmative judgment, the log management program 3001 generates a record of the selected LU in the LU status history table and writes the date and time of the relevant operation log into the start date and time in the LU status history table (step 13002).

If step 13001 returns a negative judgment, the log management program 3001 of the management computer 1100 judges whether the operation content includes "path deletion" or not (step 13003). If step 13003 returns an affirmative judgment, the log management program 3001 writes the date and time of the relevant operation log into the end date and time in the LU status history table (step 13004) and then terminates the processing.

Figure 14:
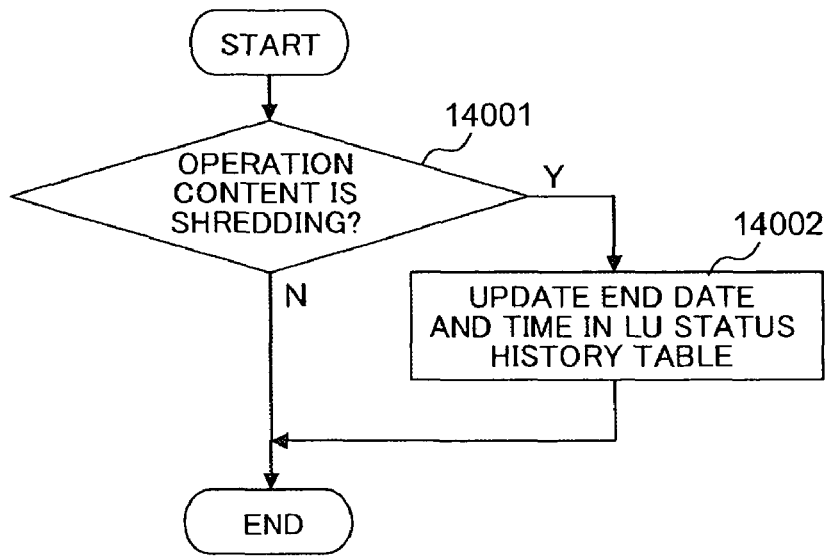
FIG. 14 is an explanatory diagram of shredding judgment processing according to the embodiment of the invention.

FIG. 14 shows the flow of the shredding judgment processing. As a result of processing executed by the CPU 1102, the log management program 3001 of the management computer 1100 judges whether the operation content includes "shredding" or not (step 14001). If step 14001 returns an affirmative judgment, the log management program 3001 generates a record of the selected LU in the LU status history table and writes the date and time of the relevant operation log into the start date and time in the LU status history table (step 14002) and then terminates the processing. At this point in time, the status of the LU status history table is as shown in FIG. 9.

According to this embodiment, the operation logs 3005 concerning the operations of volumes are associated with a time and stored in the storage apparatuses 1400, 1500, and the management computer 1100 collects information about these operation logs 3005, restores the status history of the operation logs 3005, sets, as an audit range, the operation logs 3005 including volumes in which the audit period and audit target data are stored, extracts the operation logs 3005 belonging to the audit range from the restored status history of the operation logs 3005, and transmits the extracted operation logs 3005 to the computer (requesting computer) 1000. As a result, all the audit target volumes can be identified.

Also according to this embodiment, if any operation log 3005 shows deletion(s) (shredding) of data stored in the volumes in the restored status history, such operation log 3005 is excluded from the audit range. As a result, no unnecessary operation logs will be output, so the auditing workload can be reduced.

Second Embodiment

The outline of an embodiment for implementing this invention will be explained below. The invention is implemented when a remote management computer 1600 located physically apart from a storage apparatus 1400 and a storage apparatus 1500 performs auditing, using operation logs.

Figure 15:
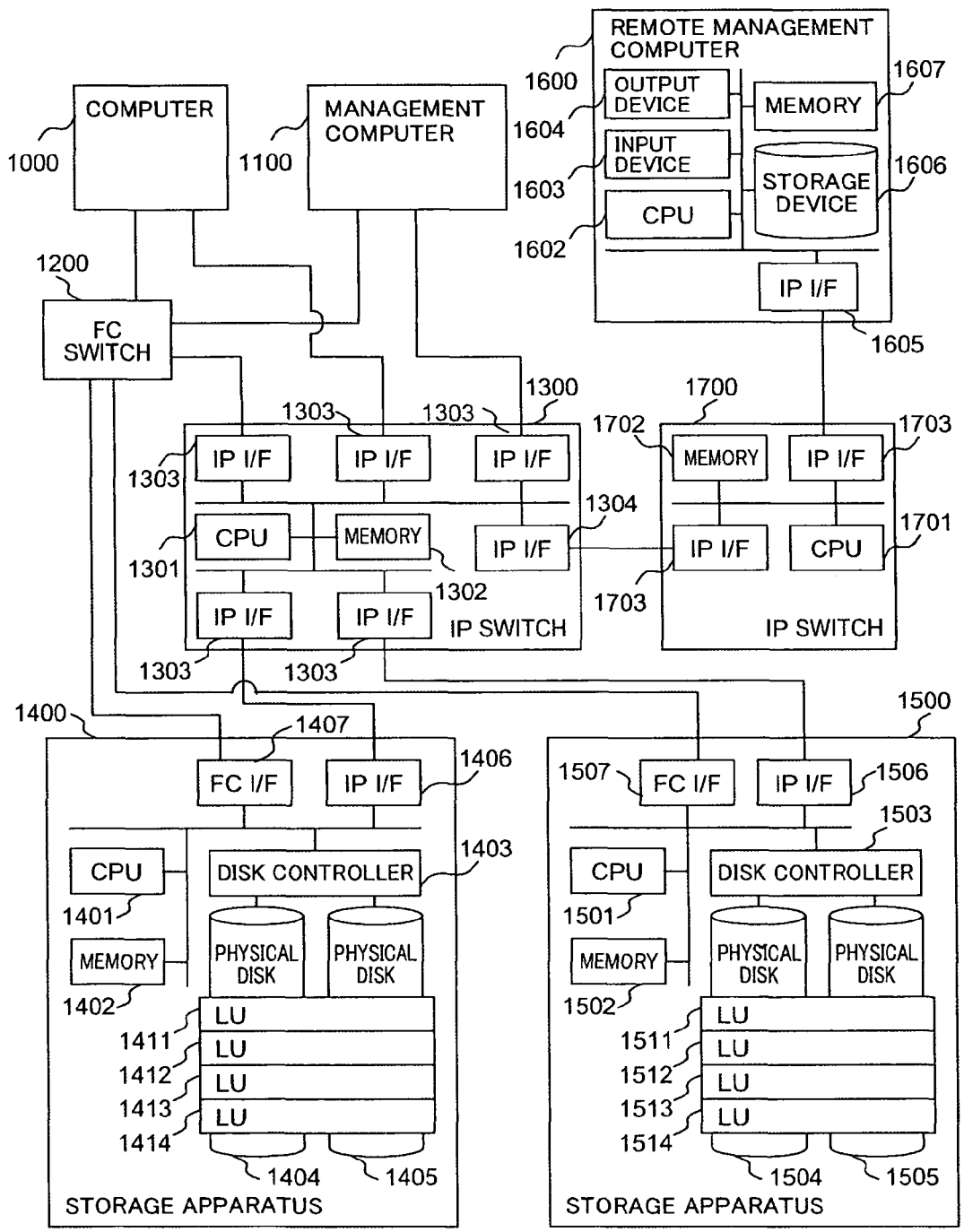
FIG. 15 is an explanatory diagram of the system configuration according to another embodiment of the invention.

FIG. 15 shows the system configuration of an embodiment for implementing the present invention. In FIG. 15, a search computer 1000, an FC switch 1200, an IP switch 1300, and storage apparatuses 1400, 1500 are similar to those used in the first embodiment.

The remote management computer 1600 is a computer that manages the management computer 1100 from a remote location. The remote management computer 1600 includes: an IP I/F 1605 for sending/receiving management data to/from the management computer 1100; a CPU 1602 for controlling the entire computer by executing programs; memory 1607 serving as a storage area for the programs; a storage device 1606 for storing, for example, the programs and user data; input devices 1603 such as a keyboard and a mouse for a user to input information; and output devices 1604 such as a display for displaying information for the user.

An IP switch 1700 is a switch device for transferring management data from the remote management computer 1600 to, for example, the management computer 1100. The FC switch 1700 includes: an IP I/F 1703 for sending/receiving management data; a CPU 1701 for controlling the entire IP switch by executing programs; and memory 1702 serving as a storage area for the programs and data.

When the remote management computer 1600 is activated, it reads into its memory 1607 the same programs and tables as in the case of the memory 1107 for the management computer 1100.

Figure 16:
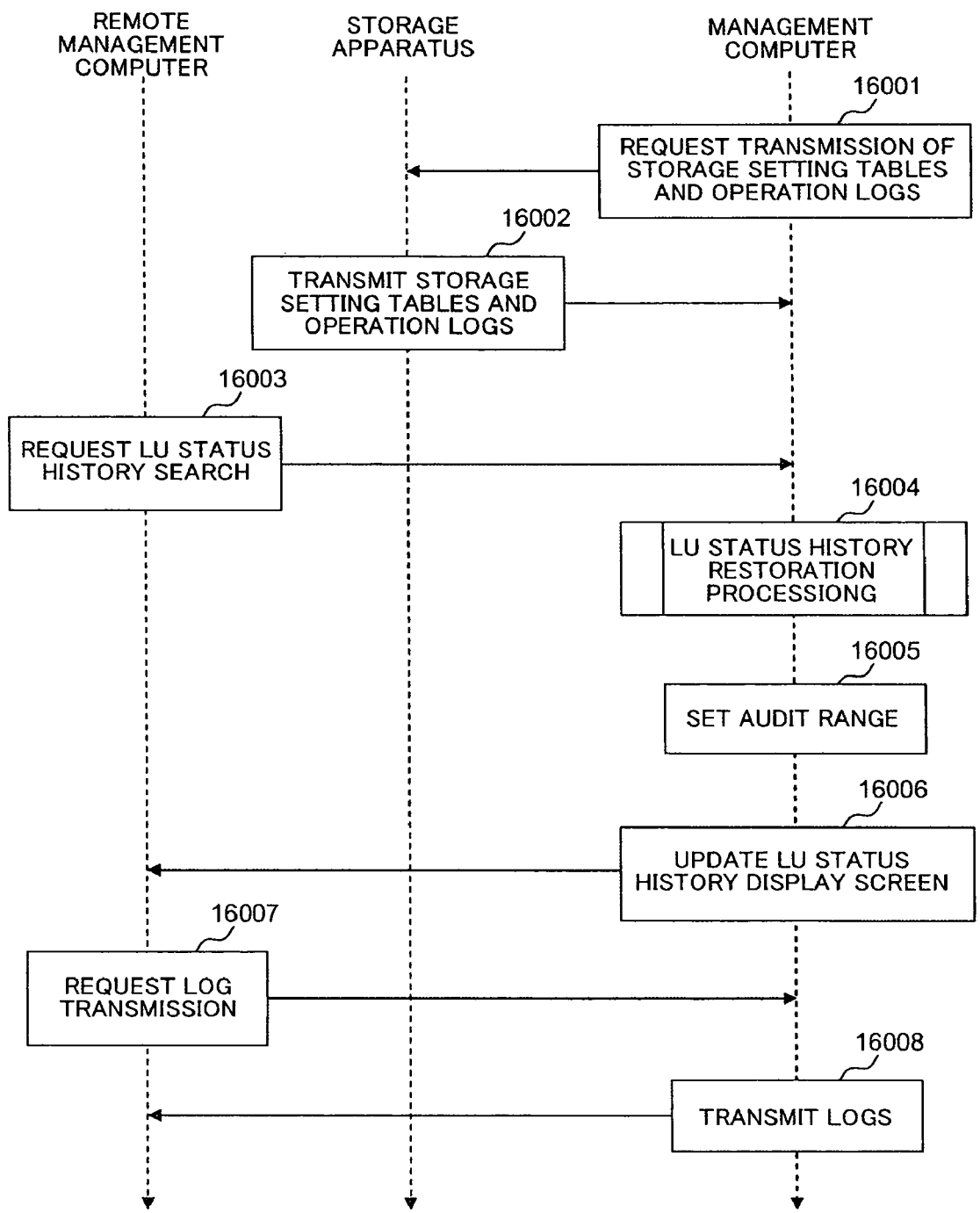
FIG. 16 is an explanatory diagram of LU status history transmission processing according to the embodiment of the invention.

FIG. 16 shows the flow of remote auditing by the remote management computer 1600. As a result of processing executed by the CPU 1602, the setting management program 3002 of the management computer 1100 sends a request for transmission of the storage setting tables and the operation logs to the storage apparatuses 1400 and 1500 (step 16001). Having received the transmission request, the setting management programs 4002, 5002 of the storage apparatuses 1400, 1500 send the storage setting tables 3004 and the operation logs 3005 to the management computer 1100 (step 16002). The storage setting tables 3004 and the operation logs 3005 may be transmitted when the transmission request from the management computer 1100 is received or when any change is made to the relevant tables or logs.

Next, an administrator designates audit target LU(s) and an audit period on an LU status history search screen 17000 of the remote management computer 1600 and sends an LU status history search request to the management computer 1100 (step 16003). After receiving this search request, the log management program 3001 of the management computer 1100 executes the LU status history restoration processing (step 16004), sets, as an audit range, the results of searching the LU status history table for the audit period and the LU(s) (16005), updates the LU status history on the LU status history search screen (step 16006), and sends the relevant logs belonging to the audit range which was set in the above-described step to the remote management computer 1600 (step 16008).

Subsequently, the administrator sends, to the management computer 1100, a request for transmission of logs to be audited from the audit target LU(s) on the LU status history search screen (step 16007). After receiving this transmission request, the log management program 3001 of the management computer 1100 sends the designated logs to the remote management computer 1600 (step 16008).

According to this embodiment, the operation logs 3005 concerning the operations of volumes are associated with a time and stored in the storage apparatuses 1400, 1500, and the management computer 1100 collects information about these operation logs 3005, restores the status history of the operation logs 3005, sets, as the audit range, the operation logs 3005 including volumes in which the audit period and audit target data are stored, sends the information about the restored status history of the operation logs 3005 to the remote management computer 1600, and in response to the log transmission request from the remote management computer 1600, sends the operation logs 3005 designated by the log transmission request to the remote management computer 1600. As a result, all the audit target volumes can be identified and it is unnecessary to send all the restored operation logs to the remote management computer 1600, so traffic can be reduced.

Also according to this embodiment, if any operation log 3005 shows deletion(s) (shredding) of data stored in the volumes in the restored status history, such operation log 3005 is excluded from the audit range. As a result, no unnecessary operation logs will be output, so the auditing workload can be reduced.

The aforementioned embodiments describe the case where the management computer 1100 collects information about the operation logs 3005 stored in the storage apparatuses 1400 and 1500, restores the status history of the operation logs 3005, and sends the restored information about the operation logs to the computer 1000 or the remote management computer 1600. However, the configuration of the invention is not limited to the above-described example, and the storage system according to this invention can be configured so that the computer 1000, the management computer 1100, or the remote management computer 1600 collects information about the operation logs 3005 stored in the storage apparatuses 1400 and 1500, restores the status history of the operation logs 3005, sets, as the audit range, the operation logs 3005 including volumes in which the audit period and the audit target data are stored, and extracts the operation logs belonging to the audit range.

Furthermore, the computer 1000, the management computer 1100, or the remote management computer 1600 can be configured as an audit requesting computer; or the computer 1000 or the remote management computer 1600 can be configured as a computer that collects information about the operation logs 3005 stored in the storage apparatuses 1400 and 1500, restores the status history of the operation logs 3005, sets, as an audit range, the operation logs 3005 including volumes in which the audit period and the audit target data are stored, and sends the operation logs belonging to the audit range to the requesting computer.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A storage system, the storage system comprising:
a storage apparatus;
a management computer; and
a remote management computer;
wherein the storage apparatus, management computer, and remote management computer are connected via a network;
wherein the storage apparatus includes:
a storage device for storing operation logs concerning the operations of logical units (LUs) in association with a time, wherein the operation logs include:
information related to one or more data migration operations, wherein the information includes, for each of the one or more data migration operations, a name of a data migration source LU and a name of a data migration destination LU;
information related to one or more external LU creation operations,
wherein the one or more external LU creation operations relate to creation of an external LU in another storage apparatus and use of the created external LU as a corresponding virtual LU in the storage apparatus, and
wherein the information includes, for each of the one or more external LU creation operations, a name of the created external LU and a name of the corresponding virtual LU; and
information related to one or more pairing operations, wherein the information includes, for each of the one or more pairing operations, a name of a primary LU and a name of a secondary LU; and
wherein the management computer:
collects the operation logs stored in the storage device for the storage apparatus;
stores the collected operation logs in the storage area;
in response to a logical unit (LU) status history search request from the remote management computer, wherein the LU status history search request indicates an audit period and audit target LUs,
restores a log status history for the audit target LUs based on the operation logs stored in the storage area,
sets, as an audit range, data in the restored operation log status history that corresponds to the audit period and the audit target LUs, and
sends information related to the restored log status history to the remote management computer;
wherein the remote management computer, in response to the information related to the restored log status history, displays chronological status history information for the audit target LUs on an LU status history search screen, wherein the chronological status history information indicates whether the audit target LUs are ordinary LUs, data migration source LUs, data migration destination LUs, external LUs, or virtual LUs; and
wherein the management computer, in response to a log transmission request from the remote management computer that indicates a designated audit target LU from among the audit target LUs identified on the LU status history search screen, transmits the operation logs for the designated audit target LU to the remote management computer.

2. The system of claim 1, wherein the log status history includes a plurality of records, each record associated with an LU operation, wherein each record indicates:
an identifier of a storage apparatus associated with an LU associated with the LU operation;
an identifier of the LU;
information that indicates a start time for the LU operation;
information that indicates end time for the LU operation; and
information that indicates a status of the LU operation.

3. The system of claim 2, wherein, when the management computer restores the log status history for the audit target LUs based on the operation logs stored in the storage area,
the management computer obtains information related to a data migration operation from the operation logs, wherein the information related to the data migration operation includes information that indicates a time associated with the data migration operation,
the management computer determines whether an LU associated with the data migration operation is a source LU or a destination LU for the data migration operation, and
if the LU associated with the data migration operation is the destination LU for the data migration operation, the management computer updates the log status history to indicate that the time associated with the data migration operation is a start time for the data migration operation, and
if the LU associated with the data migration operation is the source LU for the data migration operation, the management computer updates the log status history to indicate that the time associated with the data migration operation is an end time for the data migration operation.

4. The system of claim 2, wherein, when the management computer restores the log status history for the audit target LUs based on the operation logs stored in the storage area,
the management computer obtains information related to a pairing operation from the operation logs, wherein the information related to the pairing operation includes information that indicates a time associated with the pairing operation,
the management computer determines whether the pairing operation is a pair creation operation or a pair deletion operation,
if the pairing operation is a pair creation operation, the management computer updates the log status history to indicate that the time associated with the pairing operation is a start time for the pairing operation, and
if the pairing operation is a pair deletion operation, the management computer updates the log status history to indicate that the time associated with the pairing operation is an end time for the pairing operation.

5. The system of claim 2, wherein, when the management computer restores the log status history for the audit target LUs based on the operation logs stored in the storage area,
the management computer obtains information related to a path operation from the operation logs, wherein the information related to the path operation includes information that indicates a time associated with the path operation,
the management computer determines whether the path operation is a path generation operation or a path deletion operation,
if the path operation is a path generation operation, the management computer updates the log status history to indicate that the time associated with the path operation is a start time for the path operation, and
if the path operation is a path deletion operation, the management computer updates the log status history to indicate that the time associated with the path operation is an end time for the path operation.

6. The system of claim 2, wherein, when the management computer restores the log status history for the audit target LUs based on the operation logs stored in the storage area,
the management computer obtains information related to a shredding operation from the operation logs, wherein the information related to the shredding operation includes information that indicates a time associated with the shredding operation, and
the management computer updates the log status history to indicate that the time associated with the shredding operation is a start time for the shredding operation.

7. A method for use in a storage system, wherein the storage system includes a storage apparatus, a management computer, and a remote management computer, wherein the storage apparatus, management computer, and remote management computer are connected via a network, the method comprising:
the storage apparatus storing, in a storage device, operation logs concerning the operations of logical units (LUs) in association with a time, wherein the operation logs include:
information related to one or more data migration operations, wherein the information includes, for each of the one or more data migration operations, a name of a data migration source LU and a name of a data migration destination LU;
information related to one or more external LU creation operations,
wherein the one or more external LU creation operations relate to creation of an external LU in another storage apparatus and use of the created external LU as a corresponding virtual LU in the storage apparatus, and
wherein the information includes, for each of the one or more external LU creation operations, a name of the created external LU and a name of the corresponding virtual LU; and
information related to one or more pairing operations, wherein the information includes, for each of the one or more pairing operations, a name of a primary LU and a name of a secondary LU; and
the management computer collecting the operation logs stored in the storage device for the storage apparatus;
the management computer storing the collected operation logs in the storage area;
the management computer, in response to a logical unit (LU) status history search request from the remote management computer, wherein the LU status history search request indicates an audit period and audit target LUs:
restoring a log status history for the audit target LUs based on the operation logs stored in the storage area;
setting, as an audit range, data in the restored operation log status history that corresponds to the audit period and the audit target LUs, and
sending information related to the restored log status history to the remote management computer;
the remote management computer, in response to the information related to the restored log status history, displaying chronological status history information for the audit target LUs on an LU status history search screen, wherein the chronological status history information indicates whether the audit target LUs are ordinary LUs, data migration source LUs, data migration destination LUs, external LUs, or virtual LUs; and
the management computer, in response to a log transmission request from the remote management computer that indicates a designated audit target LU from among the audit target LUs identified on the LU status history search screen, transmitting the operation logs for the designated audit target LU to the remote management computer.

8. The method of claim 7, wherein the log status history includes a plurality of records, each record associated with an LU operation, wherein each record indicates:
an identifier of a storage apparatus associated with an LU associated with the LU operation;
an identifier of the LU;
information that indicates a start time for the LU operation;
information that indicates end time for the LU operation; and
information that indicates a status of the LU operation.

9. The method of claim 8, wherein the management computer restoring the log status history for the audit target LUs based on the operation logs stored in the storage area includes:
the management computer obtaining information related to a data migration operation from the operation logs, wherein the information related to the data migration operation includes information that indicates a time associated with the data migration operation;

the management computer determining whether an LU associated with the data migration operation is a source LU or a destination LU for the data migration operation; and if the LU associated with the data migration operation is the destination LU for the data migration operation, the management computer updating the log status history to indicate that the time associated with the data migration operation is a start time for the data migration operation; and if the LU associated with the data migration operation is the source LU for the data migration operation, the management computer updating the log status history to indicate that the time associated with the data migration operation is an end time for the data migration operation.

10. The method of claim 8, wherein the management computer restoring the log status history for the audit target LUs based on the operation logs stored in the storage area includes:

the management computer obtaining information related to a pairing operation from the operation logs, wherein the information related to the pairing operation includes information that indicates a time associated with the pairing operation;

the management computer determining whether the pairing operation is a pair creation operation or a pair deletion operation;

if the pairing operation is a pair creation operation, the management computer updating the log status history to indicate that the time associated with the pairing operation is a start time for the pairing operation; and if the pairing operation is a pair deletion operation, the management computer updating the log status history to indicate that the time associated with the pairing operation is an end time for the pairing operation.

11. The method of claim 8, wherein the management computer restoring the log status history for the audit target LUs based on the operation logs stored in the storage area includes:

the management computer obtaining information related to a path operation from the operation logs, wherein the information related to the path operation includes information that indicates a time associated with the path operation;

the management computer determining whether the path operation is a path generation operation or a path deletion operation;

if the path operation is a path generation operation, the management computer updating the log status history to indicate that the time associated with the path operation is a start time for the path operation; and if the path operation is a path deletion operation, the management computer updating the log status history to indicate that the time associated with the path operation is an end time for the path operation.

12. The method of claim 8, wherein the management computer restoring the log status history for the audit target LUs based on the operation logs stored in the storage area includes:

the management computer obtaining information related to a shredding operation from the operation logs, wherein the information related to the shredding operation includes information that indicates a time associated with the shredding operation; and the management computer updating the log status history to indicate that the time associated with the shredding operation is a start time for the shredding operation.

* * * * *